United States Patent
Stack

Patent Number: 5,137,963
Date of Patent: Aug. 11, 1992

[54] FAST CURE, ZERO FORMALDEHYDE BINDER FOR CELLULOSE

[75] Inventor: Dennis P. Stack, Santa Ana, Calif. 92706

[73] Assignee: Union Oil Company of California, Los Angeles, Calif.

[21] Appl. No.: 558,588

[22] Filed: Jul. 27, 1990

Related U.S. Application Data

[62] Division of Ser. No. 132,923, Dec. 15, 1987, Pat. No. 5,028,655.

[51] Int. Cl.$^5$ .............................................. C08L 27/00
[52] U.S. Cl. .................................... 524/519; 524/521; 524/522; 524/523; 524/524; 524/525
[58] Field of Search ............... 524/519, 521, 522, 523, 524/524, 525

[56] References Cited

U.S. PATENT DOCUMENTS

| | | | |
|---|---|---|---|
| 4,543,386 | 9/1985 | Padget et al. | 524/523 |
| 4,602,059 | 7/1986 | van Rooden et al. | 524/521 |
| 4,686,260 | 8/1987 | Lindemann et al. | 524/458 |

*Primary Examiner*—Joseph L. Schofer
*Assistant Examiner*—J. M. Reddick
*Attorney, Agent, or Firm*—Gregory F. Wirzbicki; Michael A. Kondzella; Shlomo R. Frieman

[57] ABSTRACT

Non-formaldehyde emitting binders for nonwoven cellulosic materials comprise a solution copolymer of an olefinically unsaturated organic compound having at least one carboxylate group conjugated with the olefinic linkage, which is reacted with a hydroxyalkyl ester of an olefinically unsaturated carboxylic acid. The product of said reaction is admixed with a non-formaldehyde containing latex carrier to produce a binder composition which will reach substantially fully cured wet strength in 8 seconds or less.

13 Claims, No Drawings

FAST CURE, ZERO FORMALDEHYDE BINDER FOR CELLULOSE

This application is a division of application Ser. No. 132,923, filed Dec. 15, 1987, now U.S. Pat. No. 5,028,655.

FIELD OF THE INVENTION

The invention relates to polymeric binders for cellulose and more particularly to a fast curing non-formaldehyde emitting composition based on a solution polymerized copolymer system admixed with a non-formaldehyde emitting polymeric carrier latex.

BACKGROUND OF THE INVENTION

During the past few years there has been a substantial growth in the production of high strength paper and cloth products having a nonwoven, randomly oriented structure, bonded with a polymeric resin binder. Such products are finding wide use as high strength, high absorbency materials for disposable items such as consumer and industrial wipes/towels, diapers, surgical packs and gowns, industrial work clothing and feminine hygiene products. They are also used for durable products such as carpet and rug backings, apparel interlinings, automotive components and home furnishings, and for civil engineering materials such as road underlays. There are several ways to apply such a binder to these materials, including spraying, print binding and foam application. Further, depending on the end use, various ingredients such as catalysts, cross-linkers, surfactants, thickeners, dyes and flame retardant salts may also be incorporated into the binder system.

In the high speed, high volume manufacture of cellulosic products such as wet wipes, an important binder property is a fast cure rate, i.e., the finished product must reach substantially full tensile strength in a very short time after binder application, so that production rates are not unduly slowed down. In these products, such a property is usually obtained by using a binder which is either self cross-linkable or by incorporating an external cross-linker into the binder formulation. When this is done, the cross-linker apparently not only interacts with the binder monomers but with the hydroxyl groups on the cellulose fibers to quickly form very strong bonds.

At present, there are a number of available binder formulations which meet this requirement. However, these materials are typified by incorporating one or more constituents which, over some period of time, will emit levels of formaldehyde in an amount sufficient to cause skin and respiratory irritation in many people, particularly children. Most recently, several of the leading manufacturers of nonwoven cellulosic products have expressed a desire to replace such binders with products offering equivalent levels of performance in cellulose but without the emission of formaldehyde. Although a number of ostensibly zero formaldehyde or "0 $CH_2O$" cellulose binders have been proposed, they have either not been truly "0" in formaldehyde content or have not shown sufficiently fast cure rates to be acceptable in high volume production applications.

BRIEF DESCRIPTION OF THE INVENTION

In accordance with the present invention, a fast curing, "zero" formaldehyde binder for nonwoven cellulosic materials is provided, said binder comprising a solution copolymer formed by reacting an aqueous mixture comprising a first comonomer comprised of one or more water soluble olefinically unsaturated organic compounds having at least one carboxylate group conjugated with the olefinic linkage thereof and a second water soluble comonomer comprised of one or more olefinically unsaturated carboxylic acid hydroxy esters, said copolymer solution being admixed with a non-formaldehyde emitting latex to produce a final composition which is essentially free of formaldehyde and which, when cured on nonwoven cellulosic material, will achieve at least 80% of fully cured wet tensile strength in 8 seconds or less.

DETAILED DESCRIPTION OF THE INVENTION

The present invention comprises a fast-curing, zero formaldehyde binder composition for nonwoven cellulosic materials. The binder comprises a polymeric composition formed by the solution copolymerization of a mixture containing at least two water-soluble monomers. The first of these water soluble comonomers comprises one or more organic compounds having at least one olefinically unsaturated linkage with at least one carboxylate group conjugated with the $>C=C<$ bond therein, said compounds having the general formula:

wherein $R_1$, $R_2$ and $R_3$ are independently hydrogen, halogen, nitro, amino, nitrile, and organic groups, and $R_4$ is hydrogen or an organic radical containing no more than about 10 carbon atoms. Preferably, the number of all the carbon atoms in compound (a) is no greater than 30 and, further, the sum of the carbon atoms in $R_1$ and $R_2$ combined should add up to no more than 9, with those in $R_3$ being no more than 8.

This first comonomer is reacted with a second water soluble comonomer comprised of one or more hydroxyesters of olefinically unsaturated carboxylic acids, said esters having the general formula:

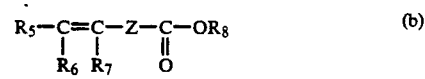

wherein $R_5$, $R_6$, and $R_7$ are independently selected from hydrogen, halogen, nitro, amino, nitrile and organic radicals, $R_8$ is an organic radical having at least 2 carbon atoms and at least one hydroxyl substituent thereon and Z is an organic radical or a covalent bond.

The solution copolymerization reaction is usually conducted with between about 0.5 part and about 4 parts, and preferably between 1 and 3 parts of said second comonomer for each part of said first comonomer. The binder composition of the present invention is formed when between about 2% and about 20%, by weight, of the resultant solution copolymer is admixed with a non-formaldehyde emitting polymeric carrier latex. Such a polymeric admixture, when cured at a suitable temperature on a matrix of nonwoven cellulosic material, will bind said material with at least 80% of fully cured wet tensile strength in 8 seconds or less.

As used herein, the term "fully-cured" means the wet tensile strength observed after a cure time of 25 seconds, and the term "water-soluble" shall denote solubility in an amount of at least 2.5% by weight at a temperature of about 90° C. in deionized water. Preferably the compounds are soluble in water to the extent of at least 5% and most preferably, at least 15%, by weight.

The term "organic" radical, when used herein, broadly refers to any carbon-containing radical. Such radicals may be cyclic or acyclic, have straight or branched chains, and can contain one or more hetero atoms such as sulfur, nitrogen, oxygen, phosphorus and the like. Further, they may be substituted with one or more substituents such as thio, hydroxy, nitro, amino, nitrile, carboxyl and halogen. In addition to aliphatic chains, such radicals may contain aryl groups, including arylalkyl and alkylaryl groups, and cycloalkyl groups, including alkyl- substituted cycloalkyl and cycloalkyl-substituted alkyl groups, with such groups, if desired, being substituted with any of the substituents listed herein above.

Preferred organic radicals for both compounds (a) and (b) are, in general, free of olefinic and alkynyl linkages and also free of aromatic groups. When cyclic groups are present, whether aromatic or nonaromatic, it is preferred that they have only one ring. In compound (a) it is further preferred that $R_1$, $R_2$, and $R_3$ be hydrogen or unsubstituted cycloalkyl or straight or branched alkyl groups which have no more than 7 carbon atoms. More preferably, $R_1$, $R_2$, and $R_3$ are hydrogen or straight or branched chain alkyl groups having no more than 5 carbon atoms. In the most preferred form of all, $R_1$, $R_2$, and $R_3$ are all independently ethyl, methyl or hydrogen with at least one of $R_1$, $R_2$ and $R_3$ either being or bearing a

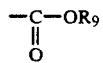

group, wherein $R_9$ is hydrogen or an organic radical having no more than about 10 carbon atoms. Preferred for $R_4$ and $R_9$ are hydrogen and alkyl or cycloalkyl groups, provided at least one of these is hydrogen, with hydrogen being most preferred for both moieties.

For compound (b) it is preferred that $R_5$, $R_6$, and $R_7$ be free of carboxylate substituents and, further, that they be hydrogen or unsubstituted cycloalkyl or straight or branched alkyl groups which have no more than 7 carbon atoms. Most preferably, $R_5$, $R_6$, and $R_7$ are hydrogen or straight or branched alkyl chains having no more than 5 carbon atoms. In the very most preferred form of all, $R_5$, $R_6$, and $R_7$ are all independently ethyl, methyl or hydrogen. $R_8$ is also preferably free of carboxylate groups and is most preferably an alkyl or cycloalkyl group, substituted with the required hydroxyl group at least 2 carbon atoms away from the carboxylate group. When Z is an organic radical, it is preferably an unsubstituted straight or branched chain alkyl or cycloalkyl group with no more than about 6 carbon atoms and, when an alkyl group, is preferably unbranched. However, most preferred for Z is a covalent bond.

Further, in regard to the water soluble comonomer of formula (a) above, which is preferably dicarboxylated as explained hereinabove, it is still more preferred that, except for the carboxylate groups, the remainder of the compound be unsubstituted, i.e., consist of only carbon and hydrogen atoms, and that the total number of carbon atoms in $R_1$, $R_2$ and $R_3$ be no more than 7, and, except for the esterifying moieties of $R_4$ and $R_9$, each side of the olefinic linkage should have no more than about 5 carbon atoms.

Suitable polymerizable, water-soluble, dicarboxylated monomers, according to the above most preferred description, include monoolefinically unsaturated dicarboxylic acids, such as tetrahydrophthalic acid, methylenesuccinic acid (itaconic acid), the cis- and trans- forms of butenedioic acid (maleic and fumaric acids), and both the cis- and trans- forms (where such exist) of the diacids resulting when one or more of the hydrogen atoms on the carbon chains of maleic/fumaric acid or itaconic acid is replaced with a methyl or ethyl group, as well as the $C_1$ to $C_{10}$ and, preferably, $C_1$ to $C_5$ semi-esters of these acids, with itaconic acid and maleic acid being most preferred.

Polymerizable, water-soluble, unsaturated acid hydroxyesters according to the above preferred description for compound (b) are hydroxyalkyl and cycloalkyl esters of acrylic and methacrylic acids, and while the esterifying moiety must have at least 2 carbon atoms, it preferably has no more than about 6, and, more preferably, no more than about 4 carbon atoms. Of the hydroxy-alkyl and cycloalkyl acrylic and methacrylic acid esters meeting these criteria, 2-hydroxyethyl acrylate is most preferred. A comonomeric mixture comprising between about 0.5 about and about 4 parts by weight of this ester and, more preferably, between about 1.5 and about 2.5 parts by weight to 1 part of one of the preferred dicarboxylic acid monomers of compound (a) has been found to be particularly efficacious in producing a copolymeric binder according to the present invention.

In addition to the basic monomeric charge, as described above, one can also add to the mixture a number of other agents. It will be understood that any percentage values hereinafter given and in the claims for such agents are each based on the basic monomeric charge. Thus, the solution copolymer composition optionally and preferably further comprises up to about 10 weight percent, more preferably up to about 4% and most preferably up to about 2% of one or more polymerizable, monoethylenically unsaturated nonionic monomers. Suitable additive monomers include $C_1$ to $C_5$ saturated esters of acrylic and methacrylic acid, vinylidene chloride and vinyl compounds such as vinyl chloride, vinyl acetate, styrene, and the like, with a mixture comprised of equal parts of ethyl acrylate and styrene being preferred. It has been found that such an addition can serve to considerably improve the shelf life of the finished copolymer, both at room temperature and at temperatures as high as about 65° C., without significantly degrading its basic properties.

Suitable copolymers of components (a) and (b) can be prepared by either thermal or, preferably, free-radical initiated solution polymerization methods. Further, the reaction may be conducted by batch, semi-batch and continuous procedures, which are well known for use in conventional polymerization reaction. Where free-radical polymerization is used, illustrative procedures suitable for producing aqueous polymer solutions involve gradually adding the monomer or monomers to be polymerized simultaneously to an aqueous reaction medium at rates proportionate to the respective percentage of each monomer in the finished copolymer and initiating and continuing said polymerization with a suitable reaction catalyst. Optionally, one or more of the comonomers can be added disproportionately throughout the polymerization so that the polymer formed during the initial stages of polymerization will have a composition and/or a molecular weight differing from that formed during the intermediate and later stages of the same polymerization reaction.

Illustrative water soluble, free-radical initiators are hydrogen peroxide, dibenzoyl peroxide, lauroyl peroxide, 2,2'-azobisisobutyro nitrile, di tertbutyl peroxide and an alkali metal (sodium, potassium or lithium) or ammonium persulfate, or a mixture of such an initiator in combination with a reducing agent activator, such as a sulfite, more specifically an alkali metabisulfite, hyposulfite or hydrosulfite, glucose, ascorbic acid, erythorbic acid, etc. to form a "redox" system. Normally the amount of initiator used ranges from about 0.01% to about 5%, by weight, based on the monomer charge. In a redox system, a corresponding range (about 0.01 to about 5%) of reducing agent is normally used.

The reaction is continued, with agitation, at a temperature sufficient to maintain an adequate reaction rate until most, or all, of the comonomers are consumed and until the solution reaches a polymer solids concentration between about 10% and about 50%, by weight. At this point, the solution normally will have a viscosity in the range between about 10 and about 500 CPS. Where experience has shown that a given comonomeric mixture will form a copolymeric solution having a viscosity in excess of about 500 CPS, between 0.1 and about 5% of a suitable chain transfer agent may also be added to the reaction mixture to produce a lower molecular weight solution copolymer having a final viscosity within the 10 to 500 cps range. Examples of suitable transfer agents are organic halides such as carbon tetrachloride and tetrabromide, alkyl mercaptans, such as sec-butyl mercaptan, and monothioglycerol with monothioglycerol being preferred.

In the present invention, polymerization temperatures in the range of about 10° C. to about 100° C. will yield satisfactory polymeric compositions. When persulfate systems are used, the solution temperature is normally in the range of 60° C. to about 100° C., while, in redox systems, the temperature is normally in the range of 30° C. to about 70° C., and preferably 30° C. to 60° C.

The zero formaldehyde binder composition of the present invention is formed when an amount of a solution of the above reaction product is admixed with a non-formaldehyde emitting polymeric carrier latex, said admixture then being diluted with deionized water to achieve a total nonvolatile solids level between about 3% and about 20% and preferably between about 8% and about 15%. There are a number of commercially available styrene-butadiene copolymer, carboxylated styrene-butadiene (i.e., a styrene-butadiene composition in which between 0.2% and 10% of one or more mono- or dicarboxylic acid monomers, such as acrylic acid, methacrylic acid, itaconic acid, maleic acid or fumaric acid, are copolymerized with the basic styrene-butadiene comonomeric mixture), vinyl acetate/acrylate copolymer and all-acrylate polymer latices which meet this requirement. Such latices are typified by being free of known formaldehyde emitting cross-linkers, such as N-methylolacrylamide, isobutoxy methylacrylamide and glyoxal bisacrylamide. While many of these laticies can be used directly as cellulosic binders, it has been found that the admixture of the solution copolymeric reaction product of the present invention in an amount ranging from about 2% to about 20%, and more preferably from about 3% to about 15%, and most preferably from about 5% to about 10%, by weight, based on the amount of latex used, will increase the wet tensile strength of a cellulosic material treated therewith by as much as 50%.

A second factor typifying these latices is that many of them are provided commercially with pH values as low as about 2. Similarly, when the copolymeric reaction combining compounds (a) and (b) is completed, the final aqueous solution will also normally have a pH in the range between about 2.0 to 3.0. While a blended composition having such a level of acidity will produce some degree of cellulosic wet strength, it has been found that neutralizing this acidity with a base, such as sodium hydroxide, to a value of between about 4.0 and 6.0 or, preferably, with ammonium hydroxide to a final pH of at least 6.0, and more preferably to about 8.0, will produce final binder compositions having considerably improved wet strength.

The invention is further described by the following examples which are illustrative of specific modes of practicing the invention and are not intended as limiting the scope of the invention as defined by the appended claims.

EXAMPLES

Example 1

A mixture comprised of 63 grams of 2-hydroxyethyl acrylate (2-HEA) and 37 grams of itaconic acid (IA), for a 2-HEA:IA weight ratio of about 1.7:1, in about 400 cc of deionized water was heated to a temperature of about 60 to 70° C., after which separate solutions of an initiator, comprised of 1 gram of sodium persulfate and an activator, comprised of 1 gram of sodium metabisulfite, each dissolved in about 10 cc of deionized water, were added. This mixture was then heated at between about 65° to 70° C. for an additional 30 minutes after which the resultant copolymer was neutralized to a pH of about 6.0 with a 25% solution of sodium hydroxide. After cooling and filtering, portions of the solution of the finished copolymer was admixed with a "standard" commercial non-formaldehyde emitting caboxylated SBR copolymer latex comprised of about 57% styrene, 38% butadiene, 3% acrylic acid and 2% itaconic acid, and diluted with deionized water to achieve a nonvolatile solids content of about 12%. One inch wide, nonwoven randomly oriented cellulose strips were then impregnated therewith and the wet tensile strength of these strips was measured, after dipping them in a 1% surfactant solution, after 0, 8, 15 and 25 seconds of cure at about 200° C., with the following results:

| Binder | Wet Tensile Strength (Pounds) | | | |
|---|---|---|---|---|
| | 0 sec | 8 sec | 15 sec | 25 sec |
| Standard SBR + 0% addition | 0.9 | 6.7 | 7.6 | 8.1 |
| Standard + 5% addition | 0.9 | 9.3 | 10.8 | 11.2 |
| Standard + 10% addition | 0.8 | 10.4 | 11.6 | 12.9 |

Note that while the initial wet tensile strengths exhibited by all 3 binder compositions were essentially the same, both the standard SBR +5% and +10% compositions (embodiments of the invention) achieved superior wet strengths in excess of 10 times the initial value and over 80% of the value observed after 25 seconds, in no more than about 8 seconds.

comparative Example 1

The results with the "Standard +10%" non-formaldehyde containing composition of Example 1 were compared to those obtained with a widely used reference commercial cellulose binder composition comprised of about 53.5% butadiene, 43.5% styrene, 2% N-methylolacrylamide and ½% each of acrylamide and itaconic acid, compounded with 6% methoxymethyl melamine, an external cross-linker and a known formaldehyde emitter (Cymel 303, supplied by The American Cyanamid Co.), with the following results:

| Binder | Wet Tensile Strength (Pounds) | | | |
|---|---|---|---|---|
| | 0 sec | 8 sec | 15 sec | 25 sec |
| "Standard + 10%" | 0.9 | 10.4 | 11.6 | 12.9 |
| "Reference" SBR + 6% Cymel 303 | 0.8 | 9.5 | 9.9 | 10.5 |

Note that after 8 seconds of cure, the "Standard +10%" (a composition of the invention) achieved a higher wet tensile strength than the commercial "reference".

Example 2

The procedure of Example 1 was followed with 1500 grams of a 1.7:1 mixture of 2-HEA and IA and about 8 grams each of styrene and ethyl acrylate being added to about 6 liters of deionized water heated to about 95° C., along with 15 grams of sodium persulfate initiator dissolved in 135 cc of deionized water. At the end of about a 3 hour reaction time, the resultant copolymer was cooled and neutralized with a 25% solution of sodium hydroxide to a pH of about 3.5 to 4.5. The resultant polymer solution was broken into 2 lots, one of which was stored at room temperature, the other at about 65° C. These lots were compared to similar sized lots prepared from the solution of Example 1. After 4 days at 65° C. and 2 weeks at room temperature, the material from Example 1 had gelled whereas the copolymeric solution of this Example was virtually unchanged at either temperature after a period of 2 weeks.

Example 3

The procedure of Example 1 was repeated with the exception that the finished binder composition was neutralized to differing pH levels with sodium hydroxide or ammonium hydroxide before strength testing, with a "5%" binder composition showing the following results:

| Base Used | pH | Time (seconds) | | | | | |
|---|---|---|---|---|---|---|---|
| | | 4 | 6 | 8 | 10 | 15 | 25 |
| | | Wet tensile strength at various times (pounds) | | | | | |
| NaOH | 4-6 | 4.7 | 7.5 | 8.2 | 8.2 | 8.8 | 9.6 |
| NaOH | 7 | 4.8 | 6.3 | 7.0 | 7.9 | 7.9 | 8.3 |
| NaOH | 8 | 4.1 | 5.5 | 6.2 | 6.5 | 7.3 | 8.0 |
| NaOH | 9 | 2.8 | 4.1 | 5.0 | 5.3 | 6.2 | 6.7 |
| NH₄OH | 4 | 4.7 | 7.5 | 8.2 | 8.2 | 8.8 | 9.6 |
| NH₄OH | 7 | 6.4 | 7.9 | 8.6 | 9.1 | 9.3 | 9.8 |
| NH₄OH | 8 | 6.3 | 8.1 | 9.1 | 9.4 | 9.9 | 10.2 |
| NH₄OH | 9 | 6.3 | 7.9 | 8.9 | 9.2 | 9.8 | 10.2 |

Note that the wet strength observed is maximum at a binder pH of 4-6 and decreases gradually above this pH range when a sodium hydroxide solution is used as a neutralizer. This result is not observed when ammonium hydroxide is used. Rather, the wet strength steadily increases with increasing pH values with the maximum being obtained at a pH of about 8. The reason for such differences in observed behavior is not known.

This invention may be embodied in other forms without departing from the spirit or essential characteristics thereof. The present embodiments and examples are, therefore, to be considered as illustrative and not restrictive, the scope of the invention being indicated by the appended claims, and all changes which come within the scope and equivalency of the claims are, therefore, intended to be embraced therein.

I claim:

1. A fast curing, zero formaldehyde binder for nonwoven cellulosic materials, comprising the admixture of a non-formaldehyde emitting latex carrier and the product of copolymerization, in aqueous solution, of a mixture comprising one or more first water-soluble comonomers having the general formula:

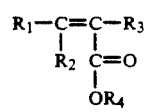

wherein $R_1$, $R_2$ and $R_3$ are independently selected from hydrogen, halogen, nitro, amino, nitrile and organic radicals, and $R_4$ is hydrogen or an organic radical; one or more second water-soluble comonomers, different from said first water-soluble comonomer, having the general formula:

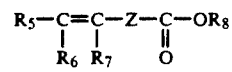

wherein $R_5$, $R_6$ and $R_7$ are independently selected from hydrogen, halogen, nitro, amino, nitrile, and organic radicals, $R_8$ is an organic radical having at least 2 carbon atoms and at least one hydroxyl substituent thereon, and Z is an organic radical or a covalent bond; and about 0.1 percent to about 10 percent, by combined weight of said first and second water-soluble comonomers, of one or more polymerizable, monoethylenically unsaturated nonionic monomers, different from said first and second water-soluble components, selected from the group consisting of $C_1$ to $C_5$ saturated esters of acrylic and methacrylic acid, vinyl acetate, vinyl chloride, styrene, and vinylidene chloride.

2. The binder of claim 1 wherein said organic radicals contain no more than about 10 carbon atoms.

3. The binder of claim 1 wherein at least one of $R_1$, $R_2$ and $R_3$ either is a

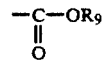

group or bears such a group, wherein $R_9$ is hydrogen or an organic radical.

4. The binder of claim 1 wherein said fist comonomer is selected from the group consisting of tetrahydrophthalic acid, and the cis- and trans-forms of butenedioic acid, methylenesuccinic acid and the diacids resulting when one or more of the hydrogen atoms on the carbon chains of butenedioic acid or methylenesuccinic acid is replaced with ethyl or methyl groups and the $C_1$ to $C_5$ semi-esters of said acids.

5. The binder of claim 1 wherein said first comonomer is selected from maleic acid and itaconic acid.

6. The binder of claim 1 wherein $R_5$, $R_6$ and $R_7$ of said second comonomer are independently selected from hydrogen, methyl or ethyl, $R_8$ is an alkyl chain having from 2 to about 6 carbon atoms with the hydroxyl group substituent thereon being located at a distance of at least 2 carbon atoms away from the carboxylate group therein.

7. The binder of claim 6 wherein $R_8$ has from 2 to about 4 carbon atoms and Z is a covalent bond.

8. The binder of claim 4 wherein said second comonomer is selected from one or more $C_2$ to $C_4$ hydroxyalkyl esters of acrylic acid or methacrylic acid.

9. The binder of claim 8 wherein said second comonomer is 2-hydroxyethyl acrylate.

10. The binder of claim 1 wherein said latex is selected from non-formaldehyde emitting styrene-butadiene copolymer and acrylate copolymer latices.

11. The binder of claim 10 wherein the amount of said product of copolymerization admixed with said latex carrier is in the range of about 2 percent and about 20 percent, by weight of said latex carrier.

12. The binder of claim 11 wherein the admixture of latex and said product of copolymerization has a total concentration of nonvolatile solids i the range between about 3 percent and about 20 percent by weight.

13. A fast-curing, zero formaldehyde binder for nonwoven cellulosic materials, comprising the product of copolymerization, in aqueous solution, of a mixture comprising 1 part by weight of a fist water soluble comonomer selected from the group consisting of tetrahydrophthalic acid, the cis and trans forms of butenedioic acid and methylenesuccinic acid, the diacids resulting when one or more of the hydrogen atoms on the carbon chains of butenedioic acid or methylenesuccinic acid is replaced with ethyl or methyl groups, and the $C_1$ to $C_5$ semi-esters of said acids; between 0.5 and 4 parts by weight of a second water soluble comonomer selected from the group consisting of one or more $C_2$ to $C_4$ hydroxyalkyl esters of acrylic acid or methacrylic acid; and about 0.1 percent to about 4 percent, by combined weight of said first and second water soluble comonomers, of one or more polymerizable, monoethylenically unsaturated nonionic monomers, different from said second water soluble comonomer, selected from the group consisting of $C_1$ to $C_5$ saturated esters of acrylic and methacrylic acid, vinyl acetate, vinyl chloride, styrene, and vinylidene chloride; said product of copolymerization being admixed with a non-formaldehyde emitting latex carrier selected from the group of styrene-butadiene copolymer, and acrylate copolymer latices in an amount between about 3 percent and about 15 percent, by weight, based on said latex carrier.

* * * * *